US009341851B2

(12) United States Patent
Hiraide

(10) Patent No.: US 9,341,851 B2
(45) Date of Patent: May 17, 2016

(54) VIRTUAL IMAGE DISPLAY APPARATUS

(71) Applicant: SEIKO EPSON CORPORATION, Tokyo (JP)

(72) Inventor: Noriaki Hiraide, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 34 days.

(21) Appl. No.: 14/260,542

(22) Filed: Apr. 24, 2014

(65) Prior Publication Data

US 2014/0340285 A1    Nov. 20, 2014

(30) Foreign Application Priority Data

May 15, 2013    (JP) ................................ 2013-102800

(51) Int. Cl.
*G09G 5/00*    (2006.01)
*G02B 27/01*    (2006.01)

(52) U.S. Cl.
CPC ........ *G02B 27/0172* (2013.01); *G02B 27/0179* (2013.01); *G02B 2027/0154* (2013.01); *G02B 2027/0158* (2013.01); *G02B 2027/0178* (2013.01)

(58) Field of Classification Search
CPC ........... G06F 3/01; G06F 3/013; G02B 27/01; G02B 27/0101; G02B 27/0179; G02B 2027/014; G02B 2027/0149; G02B 2027/0154; G02B 2027/0156; G02B 2027/0158; G02B 2027/0159; G02B 2027/0161; G02B 2027/0163; G02B 2027/0165; G02B 2027/0172; G02B 2027/0178
USPC ........................................................ 345/7, 8
See application file for complete search history.

(56) References Cited

U.S. PATENT DOCUMENTS

| 2,986,971 | A | * | 6/1961 | Jent .................... | G02C 5/124 |
|           |   |   |        |                         | 351/137 |
| 4,280,758 | A | * | 7/1981 | Flader ................ | G02C 5/124 |
|           |   |   |        |                         | 351/128 |
| 5,159,359 | A | * | 10/1992 | Pauly .................. | G02C 5/124 |
|           |   |   |        |                         | 351/124 |
| 5,539,422 | A | * | 7/1996 | Heacock et al. ................ 345/8 |
| 5,739,797 | A | * | 4/1998 | Karasawa et al. ............. 345/8 |
| 5,971,538 | A | * | 10/1999 | Heffner ...................... 351/137 |
| 6,045,223 | A | * | 4/2000 | Kawabata ............. | G02C 5/124 |
|           |   |   |        |                         | 351/136 |
| 6,480,174 | B1 | * | 11/2002 | Kaufmann et al. ............ 345/8 |
| 6,520,636 | B2 | * | 2/2003 | Saitoh ................... | G02C 5/124 |
|           |   |   |        |                         | 351/136 |
| 6,554,422 | B2 | * | 4/2003 | Bell ...................... | G02C 5/124 |
|           |   |   |        |                         | 351/128 |
| 7,542,012 | B2 | * | 6/2009 | Kato et al. ...................... 345/8 |

(Continued)

FOREIGN PATENT DOCUMENTS

JP    A-2012-163640    8/2012
KR    WO 2012005509 A2 *    1/2012    ............... G02C 5/02

*Primary Examiner* — Jason Mandeville
(74) *Attorney, Agent, or Firm* — Oliff PLC

(57) ABSTRACT

An observer can observe a video in a state in which the visual line of the observer is caused to overlook the downward side. In particular, in a virtual image display apparatus, even when the positions of the eyes, the nose, and the ears of the observer deviate from standard positions and the observer cannot observe a video in a targeted overlooking direction in a worn state in standard setting, it is possible to change an angle in an overlooking direction with respect to a front direction and cause the observer to perform observation in a suitable visual line by changing, with a nose receiving section functioning as an adjusting section, the posture of the virtual image display apparatus and adjusting an emission state of video light from a light guide member according to individual differences of the observer.

10 Claims, 11 Drawing Sheets

(56) References Cited

U.S. PATENT DOCUMENTS

| | | | |
|---|---|---|---|
| 7,591,555 B1 * | 9/2009 | Chen | G02C 5/122 351/106 |
| 8,556,414 B2 * | 10/2013 | Yoshida | 351/137 |
| 8,976,086 B2 * | 3/2015 | Hilkes | 345/8 |
| 9,075,249 B2 * | 7/2015 | Heinrich et al. | |
| 2012/0050666 A1 * | 3/2012 | Havens-Olmstead | G02C 5/126 351/132 |
| 2012/0062446 A1 * | 3/2012 | Sugiyama | 345/8 |
| 2012/0200477 A1 | 8/2012 | Fujishiro | |
| 2012/0206816 A1 * | 8/2012 | Yoshida | G02B 27/0172 359/630 |

\* cited by examiner

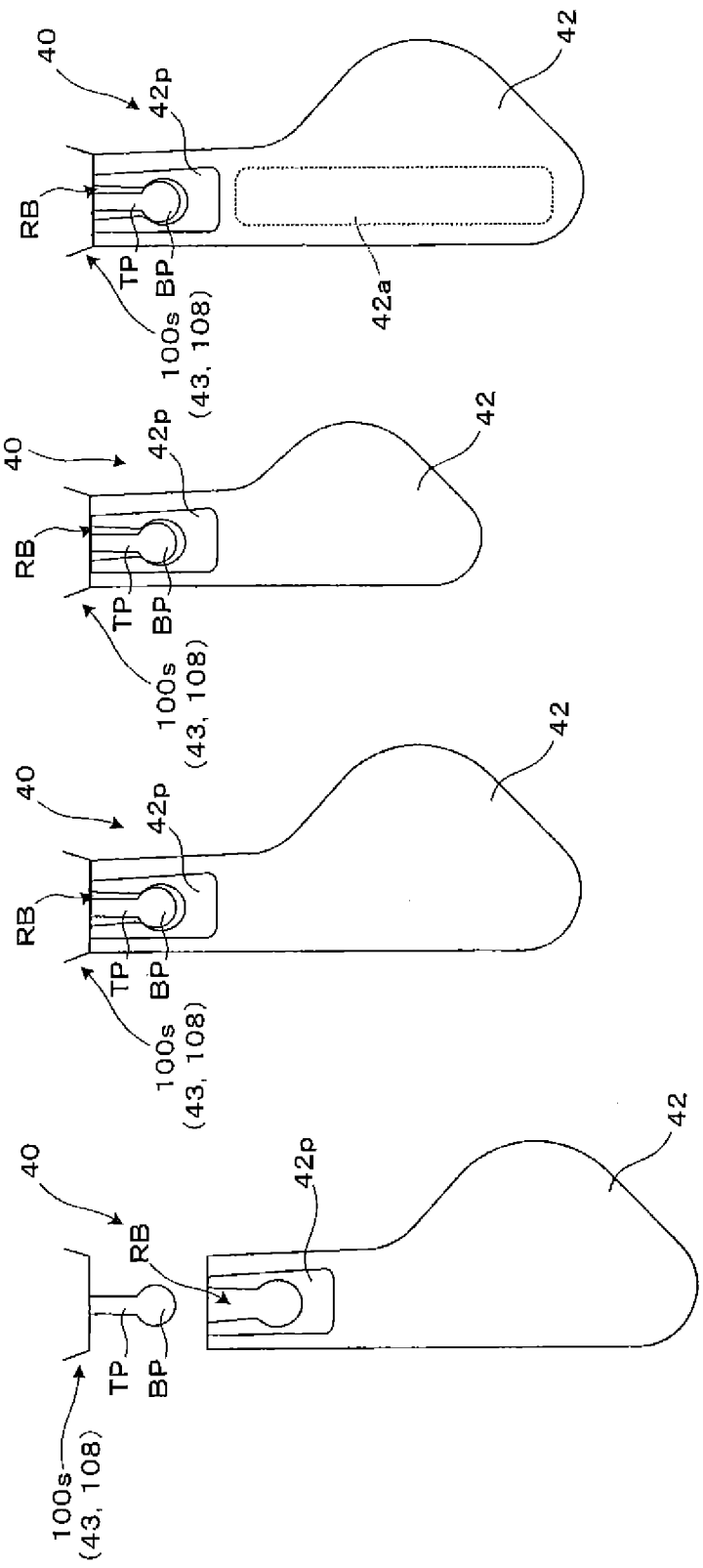

VIRTUAL IMAGE DISPLAY APPARATUS

BACKGROUND

1. Technical Field

The present invention relates to a virtual image display apparatus and a projector that present a video formed by a video display apparatus to an observer and, more particularly, to a virtual image display apparatus suitable for a head mounted display mounted on the head of the observer.

2. Related Art

Various virtual image display apparatuses are proposed as a virtual image display apparatus such as a head mounted display (hereinafter also referred to as HMD) mounted on the head of an observer (see, for example, JP-A-2012-163640 (Patent Literature 1)).

The virtual image display apparatus such as the HMD is desired to attain an increase in an angle of view without deteriorating image quality while being reduced in size and weight.

When an observer views a video on a television or the like, if the observer views the video for a long time in a straight forward state, the observer observes the video in a wide-open state of the eyes because of the structure of the human eyes. As a result, a large burden is imposed on the eyelids and the like of the observer. Therefore, it is important for the observer to adjust a posture to observe the video in a state in which the direction of the eyes (the visual line) of the observer is naturally directed to the downward side with respect to the television or the like by setting the visual line to a visual line angle in a relaxed state with the eyes closed called dark focus. The burden on the eyes during the observation also occurs in observation of a video with a virtual image display apparatus such as an HMD. If the observer looks straight forward and the burden is imposed on the eyes for a long time, the observer feels stress due to fatigue in the eyes.

However, in the observation on the virtual image display apparatus such as the HMD, the observer observes the video while wearing the apparatus, unlike the observation on the television or the like, it is difficult to change the posture of the observer according to the position of the video. Further, because of individual differences such as the sizes and a positional relation of the eyes, the ears, the nose and the like of the observer, a position where the video is seen changes. Even if the virtual image display apparatus is designed such that the visual line of the observer is directed to the downward side in a standard worn state, the observation of the video is not always performed as designed.

SUMMARY

An advantage of some aspects of the invention is to provide a virtual image display apparatus that can reduce a burden on the eyes of an observer during use and suppress stress of the observer even in long-time use.

An aspect of the invention is directed to a virtual image display apparatus including: a video device; a light guide member arranged in front of the eye of an observer and configured to direct light emitted from the video device to the eye of the observer and cause the observer to visually recognize an image; a frame configured to arrange the light guide member in a predetermined position in front of the eye and support the light guide member on the basis of a support position reference plane decided assuming at least a standard position of the eye; and an adjusting section configured to adjust an emission state of the light from the light guide member with respect to the eye of the observer. The light guide member emits light, which the light guide member should cause the observer to visually recognize, from a direction angled with respect to the support position reference plane and causes the observer to visually recognize the image from an overlooking direction for causing the eye of the observer to overlook the downward side. The adjusting section changes an angle in the overlooking direction with respect to the position of the eye of the observer by adjusting an emission state of the light from the light guide member. The support position reference plane is a plane including at least a standard position of the human eyes as an index used as a reference in designing a support position of the virtual image display apparatus assuming standard sizes, a standard positional relation, and the like concerning the human eyes, nose, and ears. By setting the support position reference plane as the reference, it is possible to cause an observer having standard facial features to visually recognize an image with a visual line from an overlooking direction at an ideal intended depression angel (e.g., a depression angle of 10° with respect to the front direction).

In the visual image display apparatus, according to design based on the support position reference plane decided assuming the standard positions of the human eyes and the like, the observer can observe a video in a state in which the visual line of the observer is caused to overlook the downward side. Therefore, it is possible to reduce a burden on the eyes of the observer during use and suppress stress of the observer even in long-time use. In particular, in the virtual image display apparatus, even when the positions of the eyes, the nose, and the ears of the observer deviate from the standard positions and the observer cannot observe a video in a targeted overlooking direction in a worn state in standard setting, it is possible to change the angle in the overlooking direction and cause the observer to observe the video with a suitable visual line by adjusting an emission state of light from the light guide member according to individual differences of the observer using the adjusting section.

In a specific aspect of the invention, the support position reference plane is a plane including a center position of the eyeball assumed as a standard position and an upper end position of the root of the ear assumed as a standard position. In this case, the apparatus is configured taking into account the position of the eyes, which is an observation position of the video, and the upper end position of the roots of the ears, which is a support position of the apparatus.

In another aspect of the invention, the adjusting section includes a nose receiving section configured to come into contact with the nose of the observer and support the apparatus during wearing and changes the posture of the nose receiving section. In this case, it is possible to change the angle in the overlooking direction by changing the posture of the nose receiving section.

In still another aspect of the invention, the adjusting section includes, as the nose receiving section, an attachment structure section configured to enable a pad section to be attached in a plurality of positions of an apparatus main body section. In this case, since it is possible to select a position where the pad section is attached by the attachment structure section, it is possible to change the posture of the nose receiving section.

In yet another aspect of the invention, the adjusting section includes a protrusion section attached to an apparatus main body section as a part of the nose receiving section and enables a pad section, which is brought into contact with the nose, to be attached to the protrusion section as a part of the nose receiving section. In this case, it is possible to change the posture of the nose receiving section by, for example, making the pad section detachably attachable to the protrusion section and selecting one pad section among a plurality of pad sections having different shapes.

In still yet another aspect of the invention, the adjusting section includes a temple section configured to come into contact with the ear of the observer to support the apparatus during wearing and changes the posture of the temple section. In this case, it is possible to change the angle in the overlooking direction by changing the posture of the temple section.

In further another aspect of the invention, the adjusting section further includes a ratchet mechanism configured to change the temple section to extend in a direction angled with respect to the support position reference plane. In this case, it is possible to change the posture of the temple section and, as a result, change the angle in the overlooking direction with the ratchet mechanism.

In still further another aspect of the invention, the adjusting section includes a deformable cored bar section built in a part of a supporting section that supports the apparatus. In this case, it is possible to change the posture of the supporting section, which supports the apparatus, such as the nose receiving section or the temple section and change the angle in the overlooking direction with the cored bar section.

In yet further another aspect of the invention, the adjusting section includes an image correcting section configured to adjust a range of image formation by the video device. In this case, it is possible to change the angle in the overlooking direction by changing a range of emission of the light from the light guide member according to image correction in the image correcting section.

In still yet further another aspect of the invention, the adjusting section adjusts an angle in the overlooking direction with respect to a front direction of the eye of the observer to be within a range of an angle larger than 0° and equal to or smaller than 15°. Consequently, it is possible to moderately change the angle in the overlooking direction without causing the observer to feel a sense of discomfort.

In a further aspect of the invention, the light guide member further includes a light transmitting member configured to guide the light emitted from the video device and enable see-through of external light and coupled to the light guide ember to supplement a see-through function for the external light. In this case, with the integrated light guide member and light transmitting member, it is possible to set the virtual image display apparatus in a see-through state in which the external light and video light are superimposed.

In a still further aspect of the invention, the adjusting section adjusts an angle in the overlooking direction with respect to a front direction of the eye of the observer in observation of the external light. In this case, in the state of see-through for visually recognizing the outside world, it is possible to adjust the angle in the overlooking direction of the video light to be optimized.

BRIEF DESCRIPTION OF THE DRAWINGS

The invention will be described with reference to the accompanying drawings, wherein like numbers reference like devices.

FIGS. 8A and 8B are diagrams schematically showing attachment and detaching of a pad section configuring a nose receiving section as an example of the nose receiving section.

FIG. 8C is a diagram schematically showing a state in which the pad section is replaced with another pad section.

FIG. 8D is a diagram schematically showing an example of another pad section.

DESCRIPTION OF EXEMPLARY EMBODIMENTS

First Embodiment

A virtual image display apparatus according to a first embodiment of the invention is explained in detail below with reference to FIG. 1 and the like.

Figure 1:
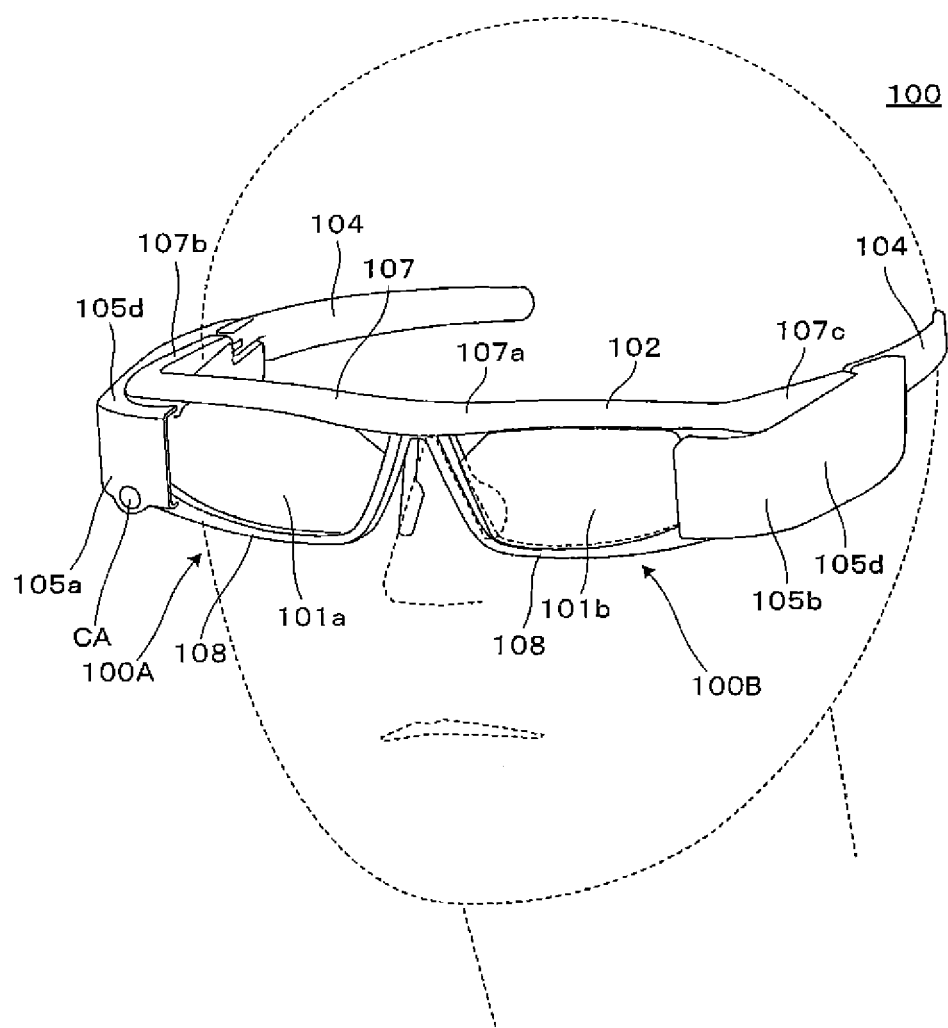
FIG. 1 is a perspective view for simply explaining the external appearance of a virtual image display apparatus in a first embodiment.

As shown in FIG. 1, a virtual image display apparatus 100 in this embodiment is a head mounted display having an external appearance like eyeglasses. The virtual image display apparatus 100 can cause an observer or a user wearing the virtual image display apparatus 100 to visually recognize image light formed by a virtual image and can cause the observer to visually recognize or observe an external image by see-through. The virtual image display apparatus 100 includes first and second optical members 101a and 101b configured to cover the front of the observer to be seen through, a frame section 102 configured to support the optical members 101a and 101b, and first and second image forming main body sections 105a and 105b added to portions from left and right ends of the frame section 102 to temple sections (temples) 104 in the back. A first display apparatus 100A formed by combining the first optical member 101a and the first image forming main body section 105a on the left side on the figure is a portion for forming a virtual image for the right eye and independently functions as a virtual image display apparatus. A second display apparatus 100B formed by combining the second optical member 101b and the second image forming main body section 105b on the right side on the figure is a portion for forming a virtual image for the left eye and independently functions as a virtual image display apparatus. The virtual image display apparatus 100 includes, in a side portion of the first display apparatus 100A, a small camera CA capable of performing an imaging operation.

Figure 2A:
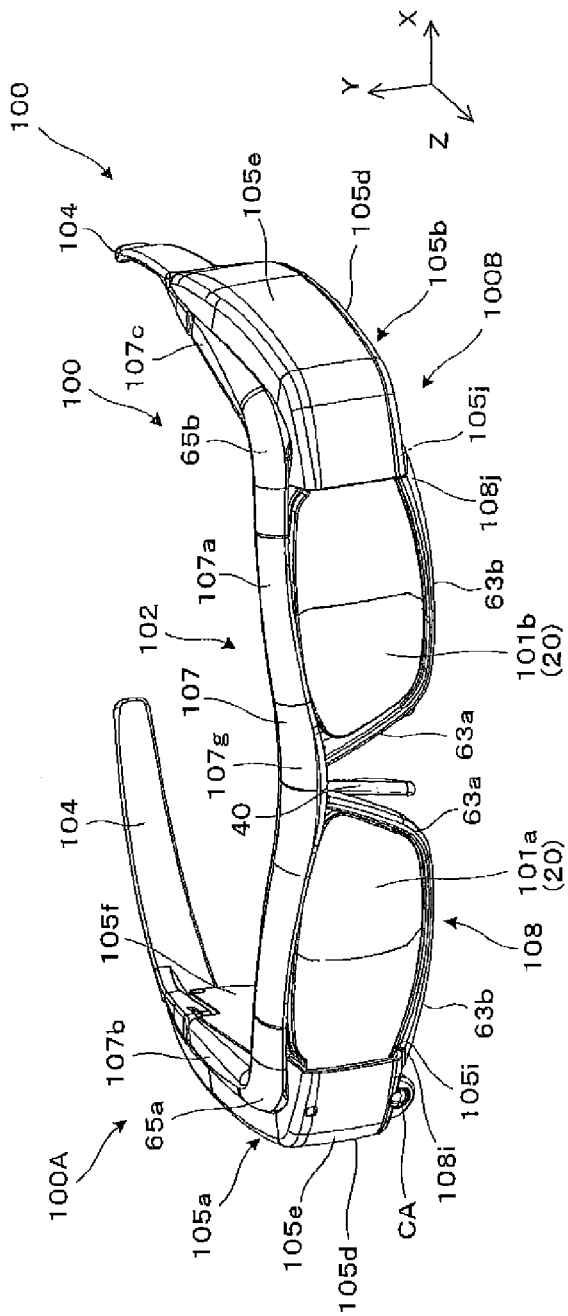
FIG. 2A is an external perspective view of the virtual image display apparatus.
Figure 2B:
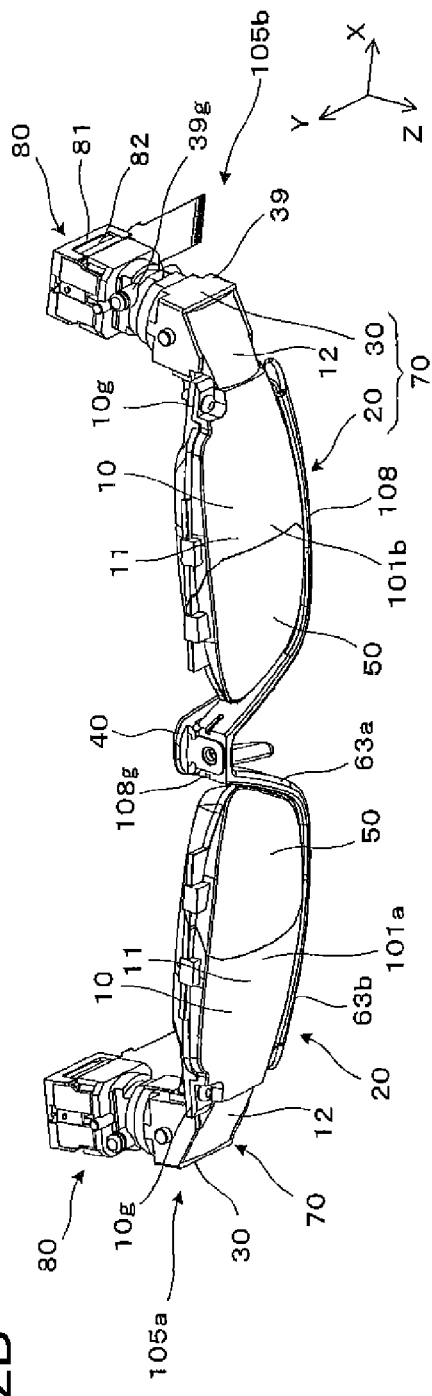
FIG. 2B is a perspective view showing the internal structure of the virtual image display apparatus excluding a frame and an armor member.

FIG. 2A is a perspective view for explaining the external appearance on the front side of the virtual image display apparatus 100. FIG. 2B is a partially exploded perspective view on the front side of the virtual image display apparatus 100.

As shown in the figures, the frame section 102 provided in the virtual image display apparatus 100 includes a frame 107 arranged on the upper side and a protector 108 arranged on the lower side. In the frame section 102, the frame 107 on the upper side shown in FIG. 2A is an elongated tabular member bent in a U shape in an XZ plane. The frame 107 includes a front surface section 107a extending in the left right lateral direction (an X direction) and a pair of side surface sections 107b and 107c extending in a front back depth direction (a Z direction). The frame 107, that is, the front surface section 107a and the side surface sections 107b and 107c are configured to mainly include a portion of metal (an aluminum frame portion) formed of aluminum die cast or other various metal materials. Since the frame 107 includes the aluminum frame portion, it is possible to maintain sufficient rigidity and secure durability of the entire apparatus while reducing the frame 107 in size and weight. The width in the depth direction (the Z direction) of the front surface section 107a is sufficiently larger than the thickness or the width of the light guide device 20 corresponding to the first and second optical members 101a and 101b. On the left side of the frame 107, specifically, in a side end portion 65a, which is a portion from the left end portion in the front surface section 107a to the side surface section 107b, the first optical member 101a and the first image forming main body section 105a are aligned and directly fixed by screwing to be supported. On the right side of the frame 107, specifically, in a side end portion 65b, which is a portion from the right end portion in the front surface section 107a to the side surface section 107c, the second optical member 101b and the second image forming main body section 105b are aligned and directly fixed by screwing to be supported. The first optical member 101a and the first image forming main body section 105a are aligned with each other by fitting. The second optical member 101b and the second image forming main body section 105b are aligned with each other by fitting. The first and second image forming main body sections 105a and 105b configuring an optical system unit are covered with a cover-like armor member 105d.

The protector 108 shown in FIGS. 2A and 2B is an under rim-like member and arranged and fixed under the frame 107 shown in FIG. 2A. A center section 108g of the protector 108 is fixed to a center section 107g of the frame 107 by fitting and screwing. The protector 108 is an elongated tabular member bent in a two-stage crank shape and integrally formed of a metal material or a resin material. A first distal end portion 108i of the protector 108 is fixed in a state in which the first distal end portion 108i is fit in a recess 105i provided in an outer member 105e of the armor member 105d configured to cover the first image forming main body section 105a. A second distal end portion 108j of the protector 108 is fixed in a state in which the second distal end portion 108j is fit in a recess 105j provided in an outer member 105e of the cover-like armor member 105d configured to cover the second image forming main body section 105b.

The frame 107 supports the first and second image forming main body sections 105a and 105b. The frame 107 also has a role of protecting the insides of the first and second image forming main body sections 105a and 105b in cooperation with the armor member 105d. The frame 107 and the protector 108 are separated from or loosely in contact with an elliptical circumferential portion of the light guide device 20 excluding a base side coupled to the first and second image forming main body sections 105a and 105b. Therefore, even if there is a difference in a coefficient of thermal expansion between the light guide device 20 in the center and the frame section 102 including the frame 107 and the protector 108, expansion of the light guide device 20 in the frame section 102 is allowed. It is possible to prevent distortion, deformation, and damage from occurring in the light guide device 20.

Figure 3:
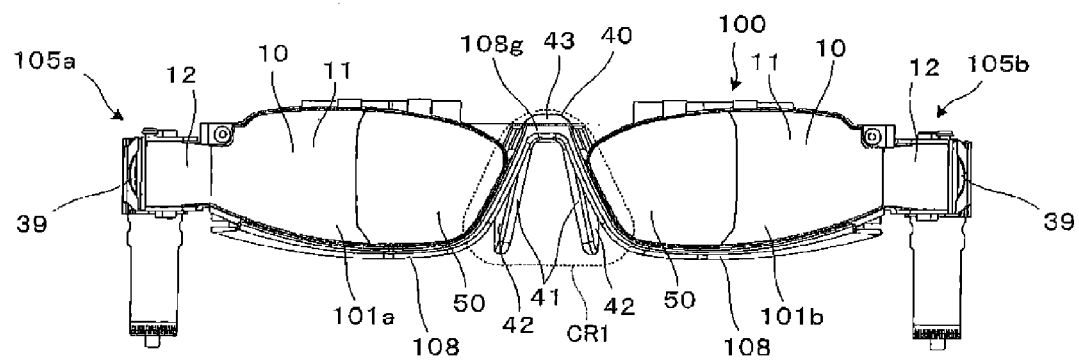
FIG. 3 is a partial exploded front view of the front side of the virtual image display apparatus.

A nose receiving section 40 is provided incidental to the frame 107. The nose receiving section 40 has a role of supporting the frame section 102 by coming into contact with the nose of the observer. The nose receiving section 40 is fixed by screwing in the center section 107g of the front section 107a of one frame 107 configuring the frame section 102 to be held in the center section 108g of the other protector 108 configuring the frame section 102. As shown in FIG. 3, the nose receiving section 40 includes a fixed section 43 in the center upper part, a pair of length adjusting members 41 extending vertically, and pad sections 42 formed at the distal ends of the adjusting members 41. The fixed section 43 is a section for stably fixing the nose receiving section 40 to the frame 107. The length adjusting members 41 have a role of adjusting an interval, a height position, and the like of the pad sections 42. That is, as shown in the figure, a center section CR including the nose receiving section 40 functions as an adjusting section configured to adjust an emission state of video light emitted from the light guide device 20 by adjusting the position of the light guide device 20 with respect to the eyes of the observer.

The temple sections 104 are fixed to the distal ends of a pair of side surface sections 107b and 107c provided in the frame 107. The temple sections 104 have a role of supporting the frame section 102 by coming into contact with the ears of the observer. Coupling sections CN (see FIG. 5B) of the temple sections 104 and the side surface sections 107b and 107c have a hinge structure. Therefore, the temple sections 104 can be folded.

As explained above, the frame section 102 and the light guide device 20 supported by the frame section 102 are arranged in front of the face of the observer by the nose receiving section 40 supported by the nose and the pair of temple sections 104 supported by the ears. In other words, an emission state of video light to the eyes of the observer is based on optical design in the virtual image display apparatus 100 and decided by the shapes and the like of the nose receiving section 40 and the temple sections 104 and physical features such as the positions of the eyes and the nose of the observer. On the other hand, in this embodiment, as explained above, the section including the nose receiving section 40 functions as the adjusting section configured to adjust an emission state of video light emitted from the light guide device 20. Therefore, it is possible to reduce a burden during observation according to individual differences of the observer.

The configurations of optical systems of the virtual image display apparatus 100 are explained below. First, the first display apparatus 100A can be seen as including a projection see-through device 70, which is an optical system for projection, and an image display device 80 configured to form a video image. The projection see-through device 70 has a role of projecting an image formed by the first image forming main body section 105a to the eyes of the observer as a virtual image. The projection transmitting device 70 includes a light guide member 10 for light guide and see-through, a light transmitting member 50 for see-through, and a projection lens 30 for imaging. That is, the first optical member 101a or the light guide device 20 is configured by the light guide member 10 and the light transmitting member 50. The first image forming main body section 105a is configured by the image display device 80 and the projection lens 30.

As shown in FIGS. 2A, 2B and FIG. 3, the light guide member 10 and the light transmitting member 50 are fixed to each other to configure the integral light guide device 20. The light guide device 20 is a light transmissive optical block-like or prism-like member configured to guide light of a video to the eyes of the observer while reflecting the video light on the inside. A main body portion surrounded by a peripheral portion in the light guide device 20 has an elliptical contour. The light transmitting member 50 is arranged in an extending direction of the first light guide portion 11 to be coupled to the first light guide portion 11 on the distal end side, that is, the emission side or the light emission side of the light guide member 10. The light transmitting member 50 is fixed to the first light guide portion 11 by joining using an adhesive. The light guide device 20 obtained by combining the light guide member 10 and the light transmitting member 50 is equivalent to the first optical member 101a shown in FIG. 1. The projection lens (the projection optical system) 30 of the projection see-through device 70 and the image display device 80 configured to form an image pattern for display are equivalent to the first image forming main body section 105a shown in FIG. 1.

Figure 4:
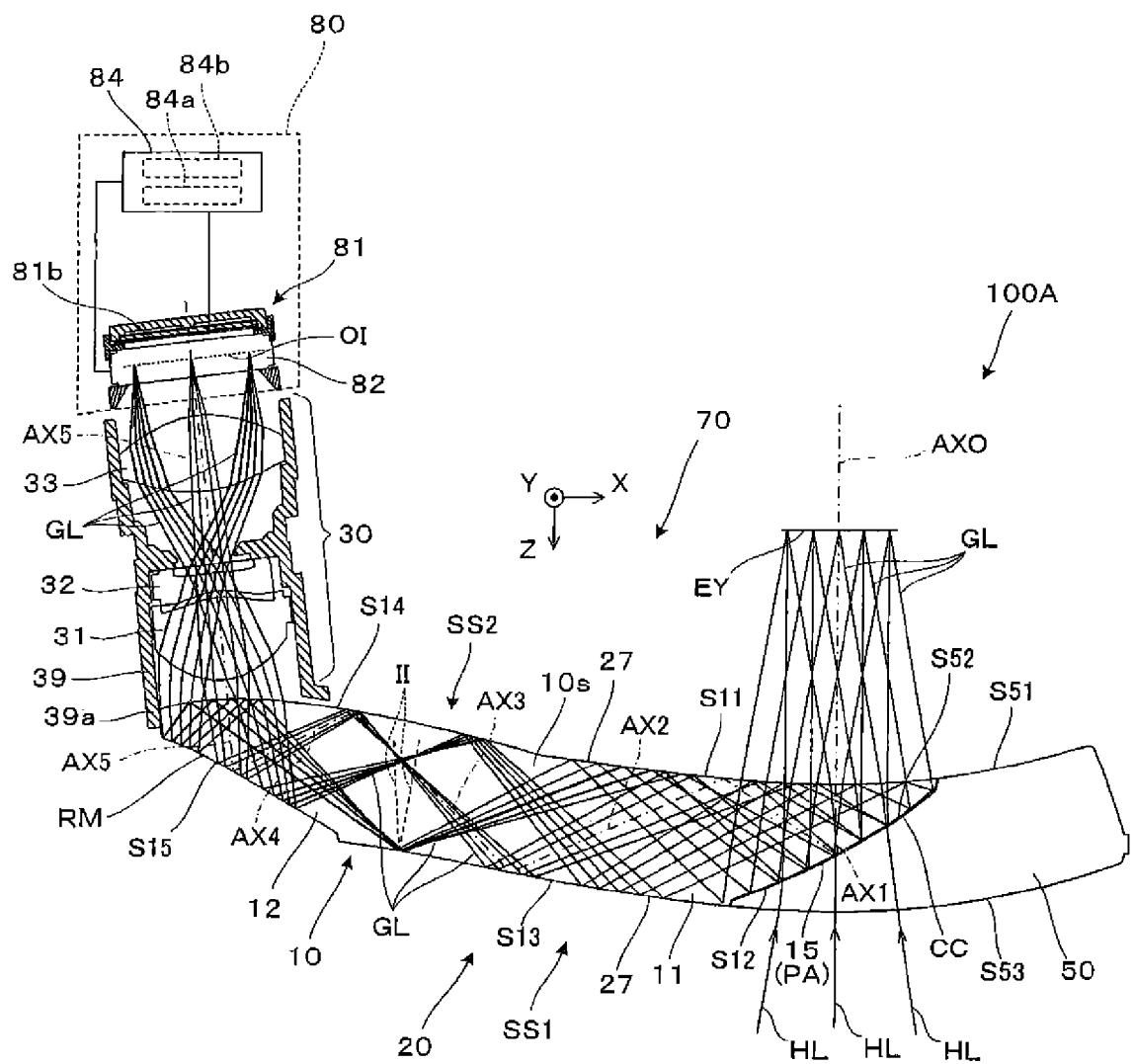
FIG. 4 is a sectional view in a vertically symmetrical surface of a first display apparatus configuring the virtual image display apparatus.

The image display device 80 and the projection lens 30 configuring the first image forming main body section 105a are explained with reference to FIG. 4 and the like.

The image display device 80 includes a lighting device 81 configured to emit illumination light, a video display device 82, which is a transmissive space light modulating device, and a driving control section 84 configured to control the operations of the lighting device 81 and the video display device 82.

The lighting device 81 of the image display device 80 includes a light source 81a configured to generates light including three colors of red, green, and blue and a backlight guide section 81b configured to diffuse light from the light source 81a and change the light to a light beam having a rectangular section. The video display device 82 is formed by, for example, a liquid crystal display device and spatially modulates illumination light emitted from the lighting device 81 and forms image light, which should be a display target such as a moving image. The driving control section 84 includes a light source driving circuit 84a and a liquid crystal driving circuit 84b. The light source driving circuit 84a supplies electric power to the lighting device 81 and causes the lighting device 81 to emit illumination light having stable luminance. The liquid crystal driving circuit 84b outputs an image signal or a driving signal to the video display device 82 to thereby form color video light or image light, which is a base of a moving image or a still image, as a transmissivity pattern. An image processing function can be imparted to the liquid crystal driving circuit 84b. However, the image processing function can also be imparted to an external control circuit.

The projection lens 30 is a projection optical system including three optical devices 31 to 33 as components. The projection lens 30 includes a lens barrel 39 configured to house and support the optical devices 31 to 33. The optical devices 31 to 33 are, for example, aspherical lenses. The optical devices 31 to 33 cooperate with a part of the light guide member 10 to form an intermediate image corresponding to a display image of the video display device 82 on the inside of the light guide member 10. The lens barrel 39 includes a rectangular frame-like engaging member 39a on the front end side. The engaging member 39a fits with a distal end portion on the second light guide portion 12 side of the light guide member 10 to enable positioning of the light guide member 10 with respect to the lens barrel 39.

A relation between a projecting direction of an image by the virtual image display apparatus 100 and a direction of the eyes (a visual line) of the observer in observation of the image and the like are explained below with reference to FIGS. 5A to 5C and the like. For the explanation, first, the configuration in design of the virtual image display apparatus 100 is explained.

Figure 5A:
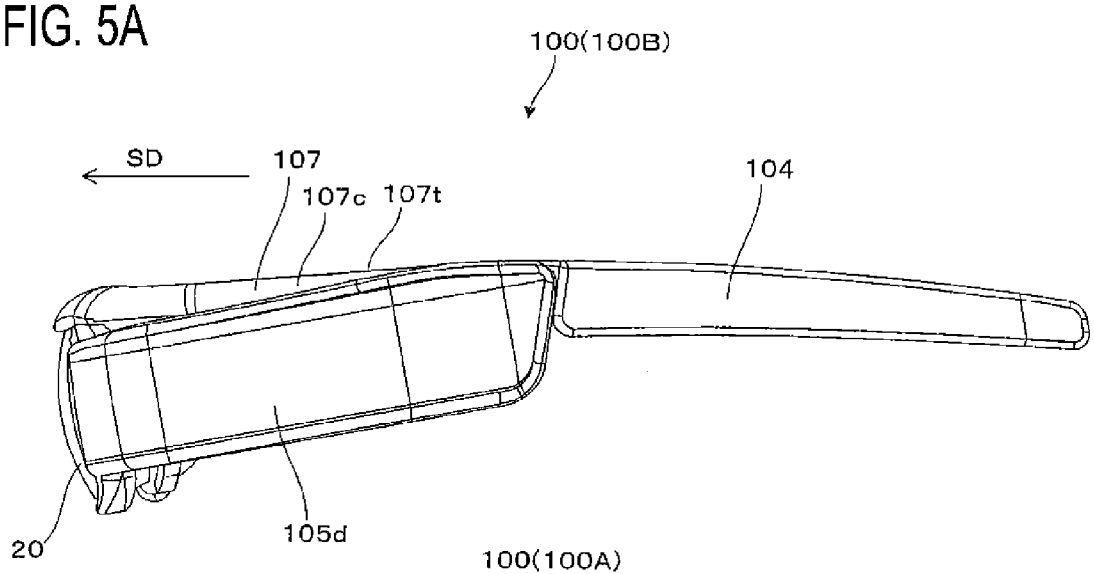
FIG. 5A is a side view of the virtual image display apparatus viewed from the left side.
Figure 5B:
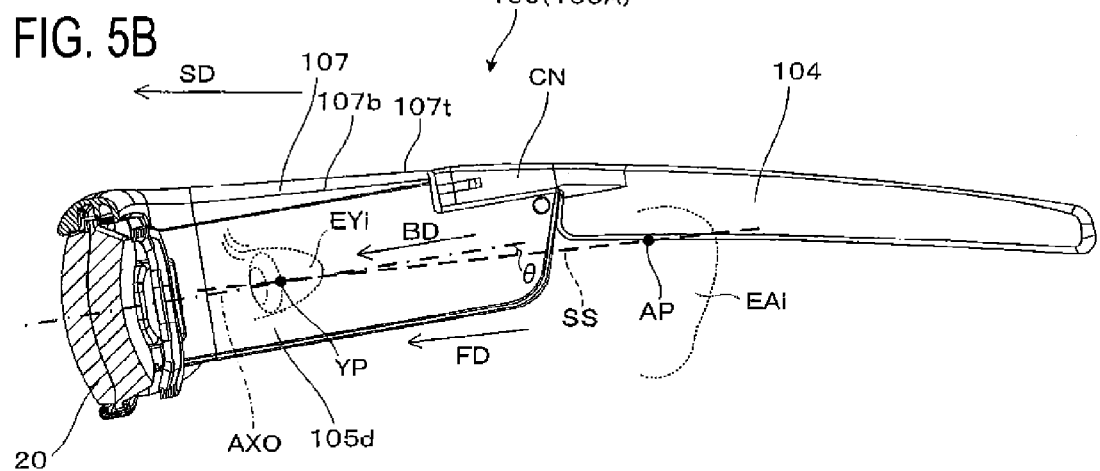
FIG. 5B is a sectional view of the virtual image display apparatus viewed from the left side.
Figure 5C:
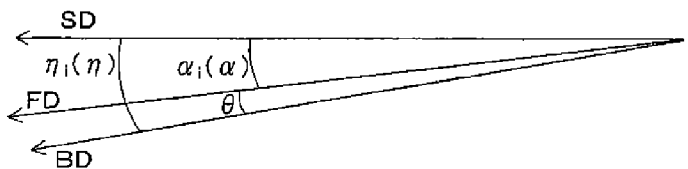
FIG. 5C is a diagram for explaining a relation among directions defined in design of the virtual image display apparatus.

FIG. 5A is a side view of the virtual image display apparatus 100 viewed from the left side. FIG. 5B is a sectional view of the virtual image display apparatus 100 viewed from the left side. FIG. 5B shows a cross section of the light guide device 20 taken along in the vertical direction. The light guide device 20 is taken along the vertical direction to include an emission side optical axis AXO (see FIG. 4). FIG. 5C is a diagram showing a relation of angles by reflecting directions defined by the respective sections of the virtual image display apparatus 100 on a plane parallel to the cross section of the light guide device 20 taken along the vertical direction (the cross section shown in FIG. 5B).

The sections of the virtual image display apparatus 100 are configured assuming standard sizes and positions of the eyes, the nose, and the ears. As shown in FIG. 5B, portions for deciding the posture of the apparatus, that is, portions in contact with and supported by a human body during wearing are configured on the basis of an imaginary eye EYi and an imaginary ear EAi assumed as being present in standard positions. More specifically, a plane including a center position YP of the eyeball of the eye EYi and an upper end position AP of the root of the Ear EAi is referred to as support position reference plane SS, which is a reference for deciding arrangement of the sections. Portions for supporting the apparatus and portions related to the portions in the virtual image display apparatus 100 are configured by deciding shapes, arrangement, and the like on the basis of the support position reference plane SS. The positions of the imaginary eye EYi and the imaginary ear EAi are determined as appropriate from, for example, an average value concerning a positional relation between the eyes and the ears of the human body and are not shown in the figures. However, it is assumed that the eyes and the ears are present in symmetrical positions and the support position reference plane SS is a plane including four points in total, i.e., center positions YP of the left and right eyes and upper end positions AP of the left and right ears present in assumed standard positions. The support position reference plane SS determined from the average value or the like of the human body in this way is a plane slightly tilting forward as shown in the figure. Therefore, in the frame 107, which is an example of the portions related to the portions in contact with and supported by the human body, for example, upper end portions 107t of side surface sections 107b and 107c, which are portions arranged on the side head section, extend in a state in which the upper end portions 107t slightly tilt forward in a direction substantially parallel to the support position reference plane SS. Since the frame 107 is arranged to have a shape matching the support position reference plane SS in this way, when a person having the eyes and the ears in the standard positions wears the virtual image display apparatus 100, that is, when a person having the eyes and the ears in the positions of the imaginary eye EYi and the imaginary ears EAi wears the virtual image display apparatus 100, the light guide device 20 assembled to the frame 107 is arranged in an appropriate position in front of the eyes and at an appropriate angle. Further, optical systems configured to form video light including the light guide device 20 are designed to emit video light from an ideal angle on the premise that the apparatus is supported in the posture explained above. As explained above, the virtual image display apparatus 100 is configured on the basis of the support position reference plane SS. Therefore, the virtual image display apparatus 100 is designed to allow an observer having standard facial features to visually recognize an image with an ideal visual line.

Design of optical systems configured to form video light in the virtual image display apparatus 100 is explained below. First, directions related to the optical systems in the virtual image display apparatus 100 are explained. FIG. 5C abstractly shows a relation among the directions defined below. In the virtual image display apparatus 100, a direction parallel to the support position reference plane SS and shown in the cross section of FIG. 5B is referred to as reference direction and indicated by reference sign FD. A front direction for the observer wearing the virtual image display apparatus 100 is indicated by reference sign SD. In FIGS. 5A to 5C, as a front direction in design, the horizontal direction is defined as the front direction SD when an observer having a standard skeleton wears the virtual image display apparatus 100 in a state in which the observer sits straight or stands. Further, in a direction in which the observer views an image in a state in which the observer overlooks the image with a visual line directed to the downward side compared with the front direction SD, that is, an overlooking direction is indicated by reference sign BD. The overlooking direction BD indicates the direction of a center axis of image light emitted from the optical systems configured to form video light. That is, as shown in FIG. 5B, the overlooking direction BD is parallel to a direction in which the emission side optical axis AXO indicating the center of video light emitted from the light guide device 20 extends. Since the overlooking direction BD is angled to below the front direction SD to a certain degree, a burden on the observer during observation is reduced.

In the virtual image display apparatus 100, the arrangement, the shapes, and the like of the optical systems configured to form video light such as the image display device 80 and the light guide device 20 are defined such that the overlooking direction BD is set at an appropriate angle on condition that the portions in contact with and supported by the human body are configured on the basis of the support position reference plane SS, that is, on the basis of the reference direction FD as explained above. Light is emitted from the overlooking direction BD.

To optimize the overlooking direction BD for the observer, in the design of the virtual image display apparatus 100, the virtual image display apparatus 100 is configured to emit video light from a direction at a defined angle θ from the reference direction FD. When the virtual image display apparatus 100 is worn in a standard (ideal) positional relation shown in FIG. 5B, the front direction SD and the reference direction FD form an angle $α_i$. In this case, when an angle formed by the front direction SD and the overlooking direction BD is represented as $η_i$, the angle $η_i$ is a value of a depression angle indicating a degree in which the eyes of the observer are directed to the downward side and is represented as follows.

$$η_i = θ + α_i \quad (1)$$

The angle $η_i$ is designed to be a visual line angle (about 10°) at which the observer is in a relax state with the eyes closed called dark focus. That is, in the design of the virtual image display apparatus 100, first, the angle $α_i$ between the reference direction FD decided in design of the portions in contact with and supported by the human body and the front direction SD in the ideal state assumed as shown in FIGS. 5A to 5C is defined. Subsequently, in the design of the optical systems configured to form video light, the angle θ is defined such that the overlooking direction BD is set at an appropriate angle in a relation with the angle $α_i$. That is, the angle $η_i$, which is a sum of the angle $α_i$ and the angle θ is defined to be an optimum state. Consequently, when the virtual image display apparatus 100 is worn in a standard state, that is, if the observer has the standard facial features, the observer can observe an image without stress in an ideal state without requiring adjustment and the like.

However, people have individual differences due to sexes, races, and the like. In general, actual positions of the eyes, the ears, and the like more or less deviate from the positions of the imaginary eye EYi and the imaginary ear EAi set as the standard as shown in FIG. 5B. On the other hand, in the virtual image display apparatus 100 designed on the basis of the standard state, numerically, among the values of Expression (1), the angle θ on the right side is a fixed value decided in the design stage of the virtual image display apparatus 100 and is invariable. On the other hand, the angle $α_i$ is an angle based on the front direction SD in the ideal state shown in FIGS. 5A to 5C and is a value that can be assumed only when the virtual image display apparatus 100 is worn in the ideal state. That is, during actual wearing, the angle $α_i$ is an angle different depending on the individual differences of the observer. As a result, the angle $η_i$ is not always in a state as assumed, that is, a state of the dark focus during the actual wearing. On the other hand, in this embodiment, the virtual image display apparatus 100 includes the nose receiving section 40 (see FIG. 3) functioning as the adjusting section configured to perform position adjustment. The virtual image display apparatus 100 makes it possible to change the angle relation to change the overlooking direction BD and adjusts a state of observation to allow the observer to select an optimum state according to a difference in senses of an individual person and enable a reduction in a burden during observation. The front direction SD can be defined as the horizontal direction when the observer faces the front in the standard worn state, for example, in the ideal state shown in FIGS. 5A to 5C. However, for example, because of a difference in a skeleton, a difference in setting of the eyes, and the like, in general, there is an individual difference concerning which direction the observer recognizes as the front. In this embodiment, eventually, it is possible to perform adjustment taking into account such individual differences as well.

Figure 6:
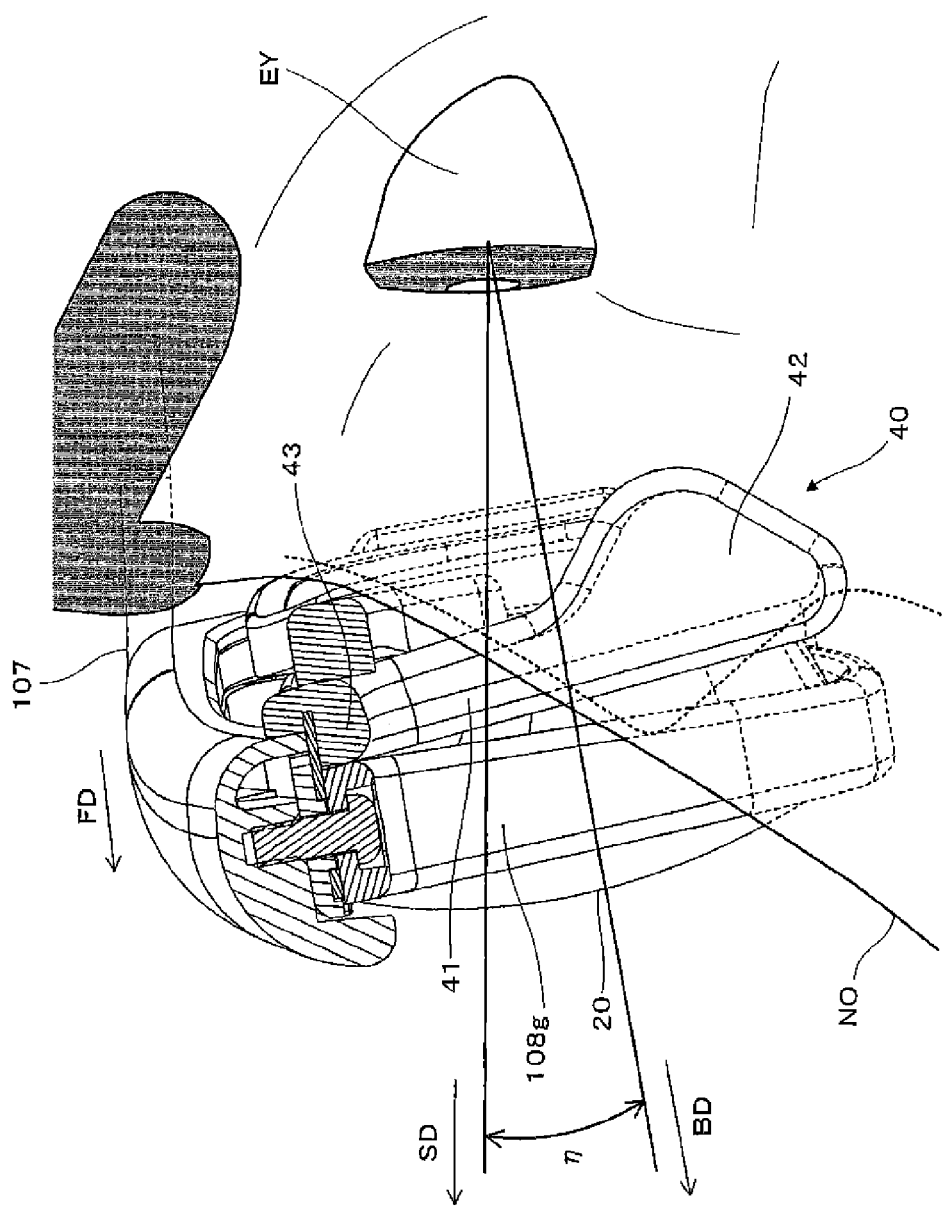
FIG. 6 is an enlarged sectional view of a part of the virtual image display apparatus for explaining a worn state.
Figure 7A:
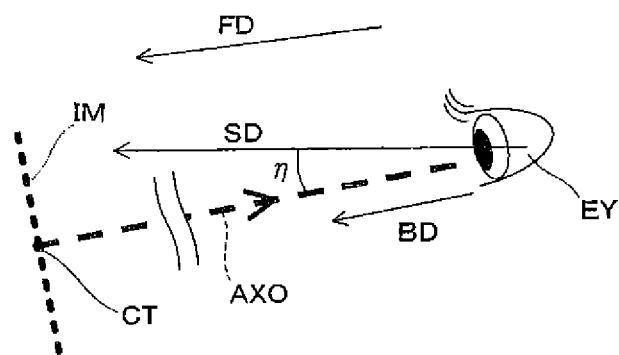
FIG. 7A is a diagram showing a relation between an emitting direction of video light in the worn state and the relation among the directions.
Figure 7B:
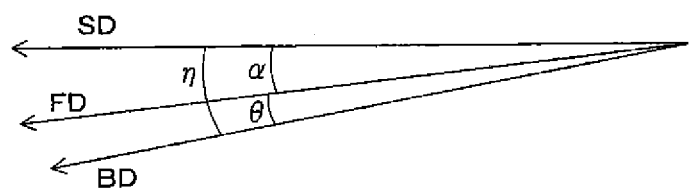
FIG. 7B is a diagram for explaining the relation among the directions in the worn state.

FIG. 6 is a diagram showing an example of a state in which the virtual image display apparatus 100 designed with reference to the standard positions of the eyes and the ears is actually worn. FIGS. 7A and 7B are diagrams for explaining a relation between an eye EY and the direction FD and the like of the observer in the actual wearing.

As shown in FIG. 6, in the actual wearing, there are the individual differences in the sizes, the shapes, a positional relation, and the like of the eye EY and the nose NO of the observer. Therefore, the arrangement of the virtual image display apparatus 100 and the eye EY of the observer is not always in the ideal state explained with reference to FIGS. 5A to 5C. A positional relation between a video and the eye EY of the observer is abstracted concerning the front direction SD, the reference direction FD, and the overlooking direction BD shown in FIG. 7A. Then, a relation among the directions is as shown in FIG. 7B as in FIG. 5C. Specifically, first, in FIG. 7A, a plane indicating a range of a virtual video concerning a virtual image recognized by video light emitted from the light guide device 20 is represented as imaginary plane IM and the center of the imaginary plane IM is represented as center CT. In this case, the emission side optical axis AXO extends in a direction perpendicular to the imaginary plane IM from center CT. The direction in which the emission side optical axis AXO extends coincides with the overlooking direction BD (the direction of a visual line axis). In this case, when an angle formed by the front direction SD with respect to the reference direction FD is represented as α and an angle formed by the front direction SD and the overlooking direction BD is represented as η, the angle η is represented as follows using the angle θ already decided in the design stage of the virtual image display apparatus 100.

$$\eta = \theta + \alpha \quad (2)$$

The angle α in Expression (2) is a value different depending on an individual difference as explained above and does not always coincide with the ideally-defined angle $\alpha_i$ of Expression (1). In other words, the front direction SD is a direction that respective observers feel to be the front. Since there are individual differences, the angle α of Expression (2), which is the angle formed by the front direction SD and the reference direction FD is a value not unconditionally determined. On the other hand, a value of the angle θ is a specified value decided during the design of the virtual image display apparatus 100 as explained above. During wearing, the value of the angle θ is an invariable value and coincides with the value in Expression (1). Therefore, in this case, to adjust the angle η to keep an angle of about 10°, which is generally considered an ideal value, it is desirable to adjust the angle α to a value coinciding with or substantially equal to the ideal angle $\alpha_i$. This means that, from another perspective, the reference direction FD is changed with respect to the front direction SD, that is, the posture of the virtual image display apparatus 100 with respect to the observer is changed. Further, this means that, as a result of the change, the overlooking direction ED is also changed. An ideal value of the angle η is about 10°. However, from the viewpoint of the individual differences, absence of a sense of discomfort concerning an external appearance of the virtual image display apparatus 100, and the like, it is desirable that the angle of the overlooking direction BD with respect to the front direction SD of the eye EY of the observer is adjusted by the nose receiving section 40, which is an adjusting section, to be within a range of an angle larger than 0° and equal to or smaller than 15°.

An example of a specific configuration of the nose receiving section 40 and the like are explained below with reference to FIGS. 8A to 8B. FIGS. 8A and 8B are diagrams schematically showing, in the example of the nose receiving section 40, attachment and detachment of the pad section 42 configuring the nose receiving section 40. A pair of left and right pad sections 42 is provided (see FIG. 3, etc.). However, since the pad sections 42 have a symmetrical structure, only one of the pad sections 42 is shown. The other is not shown in the figure and not explained.

As shown in the figure, the nose receiving section 40 includes a protrusion section TP attached to an apparatus main body section 100s (e.g., a portion equivalent to the protector 108 and the fixed section 43 of the nose receiving section 40 shown in FIG. 3) side of the protector 108 and the like (see FIG. 3, etc.). On the other hand, the pad section 42 of the nose receiving section 40 includes an inserting section 42p provided to correspond to the protrusion section TP. The inserting section 42p forms a concave section RP. The protrusion section TP includes a distal end portion BP swelled in a spherical shape. On the other hand, the inserting section 42p is made of, for example, a resin or rubber material having elasticity. The concave section RP is formed in a shape matching the distal end portion BP of the protrusion section TP. Consequently, the pad section 42 can be detachably fixed to the apparatus main body section 100s by fitting the concave section RP of the inserting section 42p with the protrusion section TP to attach the pad section 42. Further, as shown in FIGS. 8B and 8C, a plurality of the pad sections 42 having different sizes are prepared. An appropriate pad section 42 can be selected according to the sizes and the positions of the eyes, the nose, and the like of the observer.

FIG. 8D is a diagram schematically showing an example of another pad section 42. As shown in the figure, a deformable cored bar section 42a may be built in the inside of the pad section 42. That is, position adjustment may be performed by deforming the cored bar section 42a.

Consequently, in the virtual image display apparatus 100 in this embodiment, it is possible to change, with the nose receiving section 40 functioning as the adjusting section, the angle η in the overlooking direction BD with respect to the front direction SD according to the individual differences of the observer and cause the observer to perform observation with a suitable visual line.

Details of the functions, the operations, and the like of the projection see-through device 70 and the like are explained below with reference to FIG. 4. In the projection see-through device 70, the light guide member 10, which is a part of the light guide device 20, is an arcuate member bent along the face surface in plan view. In the light guide member 10, the first light guide portion 11 is arranged on a center side, that is, a light emission side close to the nose. As side surfaces having an optical function, the first light guide portion 11 includes a first surface S11, a second surface S12, and a third surface S13. The second light guide portion 12 is arranged on a peripheral side, that is, a light incident side apart from the nose. As side surfaces having an optical function, the second light guide portion 12 includes a fourth surface S14 and a fifth surface S15. Among the surfaces, the first surface S11 and the fourth surface S14 are continuously adjacent to each other. The third surface S13 and the fifth surface S15 are continuously adjacent to each other. The second surface S12 is arranged between the first surface S11 and the third surface S13. The fourth surface S14 and the fifth surface S15 are adjacent to each other at a large angle.

In the light guide member 10, the surface S11 is a free curved surface having an emission side optical axis AXO parallel to the Z axis as a center axis. The second surface 612 is a free curved surface having an optical axis AX1, which is included in a reference plane (a cross section shown in the figure) parallel to the XZ plane and inclines with respect to the Z axis, as a center axis. The third surface S13 is a free curved surface having the emission side optical axis AXO as a center axis. The fourth surface 614 is a free curved surface having an optical axis AX5 parallel to a bisector of a pair of optical axes AX3 and AX4, which are included in the reference plane parallel to the XZ plane and incline with respect to the Z axis, as a center axis. The fifth surface S15 is a free curved surface having a bisector of a pair of optical axes AX4 and AX5, which are included in the reference plane parallel to the XZ plane and incline with respect to the Z axis, or a line forming a small angle with the bisector as a center axis. The first to fifth surfaces S11 to S15 have a symmetrical shape in a perpendicular (or longitudinal) Y axis direction across the reference plane (the cross section shown in the figure) that extends horizontally (or laterally) and is parallel to the XZ plane and through which the optical axes AX1 to AX5 and the like pass.

A main body 10s of the light guide member 10 is formed of a resin material showing high light transmissivity in a visible range. The main body 10s is formed by, for example, injecting thermoplastic resin into a mold and solidifying the thermoplastic resin. As the material of the main body 10s, for example, cycloolefin polymer can be used. The main body 10s is an integral molded product. However, the light guide member 10 can be functionally divided into the first light guide portion 11 and the second light guide portion 12 as explained above. The first light guide portion 11 enables wave guide and emission of video light GL and enables transmission of the external light HL. The second light guide portion 12 enables incidence and wave guide of the video light GL.

In the first light guide portion 11, the first surface S11 functions as a refraction surface that emits the video light GL to the outside of the first light guide portion 11 and functions as a total reflection surface that totally reflects the video light GL on the inner surface side. The first surface S11 is arranged in front of an eye EY and is formed in a concave surface shape with respect to the observer. The first surface S11 is a surface formed by a hard coat layer 27 applied to the surface of the main body 10s.

The second surface S12 is the surface of the main body 10s. A half mirror layer 15 is incidental to the surface. The half mirror layer 15 is a reflection film having light transmissivity (i.e., a semi-transmitting reflection film). The half mirror layer (the semi-transmitting reflection film) 15 is formed on a partial area PA where the second surface 12 is narrowed in the vertical direction along the Y axis rather than over the entire second surface S12 (see FIG. 7A). The half mirror layer 15 is formed by forming a metal reflection layer and a dielectric multilayer film on the partial area PA in a base surface of the main body 10s. The reflectance of the half mirror layer 15 to the video light GL is set to 10% or higher and 50% or lower in an assumed incident angle range of the video light GL from the viewpoint of facilitating observation of the external light HL by see-through. The reflective index of the half mirror layer 15 to the video light GL in a specific example is set to, for example, 20%. The transmittance of the half mirror layer 15 to the video light GL is set to, for example, 80%.

The third surface S13 functions as a total reflection surface that totally reflects the video light GL on the inner surface side. The third surface S13 is arranged in front of the eye EY. Like the first surface S11, the third surface S13 is formed in a concave surface shape with respect to the observer. When the external light HL is seen through the first surface S11 and the third surface S13, visibility is substantially zero. The third surface S13 is a surface formed by the hard coat layer 27 applied to the surface of the main body 10s.

In the second light guide portion 12, the fourth surface S14 functions as a total reflection surface that totally reflects the video light GL on the inner surface side. The fourth surface S14 also functions as a refractive surface that makes the video light GL incident in the second light guide portion 12. The fourth surface S14 is a surface formed by the hard coat layer 27 applied to the surface of the main body 10s.

In the second light guide portion 12, as explained above, the fifth surface S15 is formed by forming a light reflection film RM formed of an inorganic material on the surface of the main body 10s and functions as a reflection surface.

As explained above, the light transmitting member 50 is fixed integrally with the light guide member 10 to configure the one light guide device 20. The light transmitting member 50 is a member that supports a see-through function of the light guide member 10 (an auxiliary optical block). As side surfaces having an optical function, the light transmitting member 50 includes a first transmitting surface S51, a second transmitting surface S52, and a third transmitting surface S53. The second transmitting surface S52 is arranged between the first transmitting surface S51 and the third transmitting surface S53. The first transmitting surface S51 is present on a curved surface formed by extending the first surface S11 of the light guide member 10. The second transmitting surface S52 is a curved surface joined to and integrated with the second surface S12 by a bonding layer CC. The third transmitting surface S53 is present on a curved surface formed by extending the third surface S13 of the light guide member 10. Among the surfaces, the second transmitting surface S52 and the second surface S12 of the light guide member 10 are integrated by joining via the thin bonding layer CC. Therefore, the second transmitting surface S52 and the second surface S12 have shapes having substantially the same curvatures.

The light transmitting member (the auxiliary optical block) 50 shows high light transmissivity in the visible range. A main body portion of the light transmitting member 50 is formed of a thermoplastic resin material having a refractive index substantially the same as the refractive index of the main body 10s of the light guide member 10. The light transmitting member 50 is formed by joining the main body portion to the main body 10a of the light guide member 10 and then, in a joined state, forming a film together with the main body 10s using hard coat. That is, like the light guide member 10, the hard coat layer 27 is applied to the surface of the main body portion of the light transmitting member 50. The first transmitting surface S51 and the third transmitting surface S53 are surfaces formed by the hard coat layer 27 applied to the surface of the main body portion.

An optical path of the video light GL and the like in the virtual image display apparatus 100 is explained below. The video light GL emitted from the video display device (the video device) 82 is made incident on the fourth surface S14 having positive refractive power provided in the light guide member 10 while being focused by the projection lens 30.

The video light GL passed through the fourth surface S14 of the light guide member 10 travels while converging. When the video light GL passes through the second light guide portion 12, the video light GL is reflected on the fifth surface S15 having relatively weak refractive power, made incident on the fourth surface S14 again from the inner side, and reflected.

In the first light guide portion 11, the video light GL reflected on the fourth surface S14 of the second light guide portion 12 is made incident on the third surface S13 having relatively weak positive refractive power and totally reflected and made incident on the first surface S11 having relatively weak negative refractive power and totally reflected. The video light GL forms an intermediate image in the light guide member 10 before and after the video light GL passes through the third surface S13. An image surface II of the intermediate image corresponds to an image surface OI of the video display device 82.

The video light GL totally reflected on the first surface S11 is made incident on the second surface S12. In particular, the video light GL made incident on the half mirror layer 15 is partially reflected while being partially transmitted, made incident on the first surface S11 again, and passes through the first surface S11. The half mirror layer 15 acts as a layer having relatively strong positive refractive power with respect to the video light GL reflected on the surface. The first surface S11 acts as a surface having negative refractive power with respect to the video light GL that passes through the surface.

The video light GL passed through the first surface S11 is made incident on the pupil of the eye EY of the observer or a position equivalent to the pupil as a substantially parallel light beam. That is, the observer observes an image formed on the video display device (the video device) 82 by the video light GL serving as a virtual image.

On the other hand, in the external light HL, light made incident further on a −X side than the second surface S12 of the light guide member 10 passes through the third surface S13 and the first surface S11 of the first light guide portion 11. At this point, positive and negative refractive powers of the light are offset and aberration of the light is corrected. That is, the observer observes an external image with little distortion through the light guide member 10. Similarly, in the external light HL, light made incident further on a +X side than the second surface S12 of the light guide member 10, that is, light made incident on the light transmitting member 50 passes through the third transmitting surface S53 and the first transmitting surface S51 provided in the light transmitting member 50. At this point, positive and negative refractive powers of the light are offset and aberration of the light is corrected. That is, the observer observes an external image with little distortion through the light transmitting member 50. Further, in the external light HL, light made incident on the light transmitting member 50 corresponding to the second surface S12 of the light guide member 10 passes through the third transmitting surface S53 and the first surface S11. At this point, positive and negative refractive powers of the light are offset and aberration of the light is corrected. That is, the observer observes an external image with little distortion through the light transmitting member 50. Both of the second surface S12 of the light guide member 10 and the second transmitting surface S52 of the light transmitting member 50 have substantially the same curved surface shapes and have substantially the same refractive indexes. A gap between the surfaces is filled by the bonding layer CC having substantially the same refractive index. That is, the second surface S12 of the light guide member 10 and the second transmitting surface S52 of the light transmitting member 50 do not act as a refracting surface with respect to the external light HL.

However, the external light HL made incident on the half mirror layer 15 is partially reflected while being partially transmitted through the half mirror layer 15. Therefore, the external light HL from a direction corresponding to the half mirror layer 15 is weakened to the transmittance of the half mirror layer 15. On the other hand, the video light GL is made incident from a direction corresponding to the half mirror layer 15. Therefore, the observer observes an external image together with an image formed on the video display device (the video device) 82 in the direction of the half mirror layer 15.

In the video light GL propagated in the light guide member 10 and made incident on the second surface S12, light not reflected on the half mirror layer 15 is made incident in the light transmitting member 50. However, the light is prevented from returning to the light guide member 10 by a not-shown reflection preventing section provided in the light transmitting member 50. That is, the video light GL passed through the second surface S12 is prevented from being returned onto the optical path and changing to stray light. The external light HL made incident from the light transmitting member 50 side and reflected on the half mirror layer 15 is returned to the light transmitting member 50. However, the external light HL is prevented from being emitted to the light guide member 10 by the not-shown reflection preventing section provided in the light transmitting member 50. That is, the external light HL reflected on the half mirror layer 15 is prevented from being returned onto the optical path and changing to stray light.

As it is evident from the above explanation, with the virtual image display apparatus 100 in this embodiment, the observer can observe a video with the visual line of the observer directed to the downward side. Therefore, it is possible to reduce a burden on the eye EY of the observer during use and suppress stress of the observer even in long-time use. In particular, in the virtual image display apparatus 100, even when the positions of the eyes, the nose, and the ears of the observer deviate from the standard positions and the observer cannot observe a video in a targeted overlooking direction in a worn state in standard setting, the posture (the wearing stage) of the virtual image display apparatus 100 designed on the basis of the support position reference plane SS for defining the standard positions is adjusted by the nose receiving section 40 functioning as the adjusting section. An emission state of the video light GL from the light guide member 10 is adjusted according to individual differences of the observer using the adjusting section. Consequently, it is possible to change the angle η in the overlooking direction BD with respect to the front direction SD and cause the observer to observe the video with a suitable visual line according to the individual differences of the observer. In this case, in a see-through state in which the outside world can be recognized, the observer can adjust an angle in the overlooking direction of video light with respect to an external image to be optimized by recognizing the front direction from the external image and adjusting the angle in the overlooking direction according to the recognized front direction.

Second Embodiment

A virtual image display apparatus according to a second embodiment is explained with reference to FIG. 9A to 9C. The virtual image display apparatus in this embodiment is a modification of the virtual image display apparatus 100 in the first embodiment. The virtual image display apparatus in this embodiment is the same as the virtual image display apparatus 100 in the first embodiment except the structure of an adjusting section including a nose receiving section. Therefore, only the nose receiving section and sections around the nose receiving section are explained. The entire configuration and the like of the virtual image display apparatus are not shown in the figures and not explained.

Figure 9A:
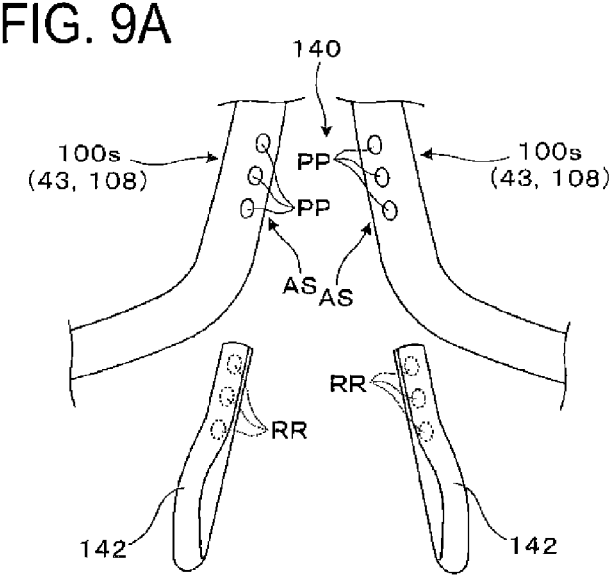
FIG. 9A is a diagram schematically showing an example of a nose receiving section in a virtual image display apparatus according to a second embodiment.
Figure 9B:
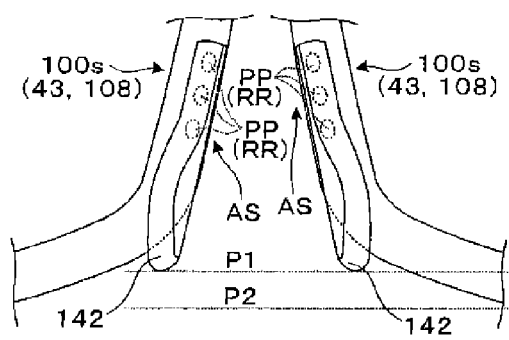
FIGS. 9B and 9C are diagrams schematically showing attachment and detachment of a pad section configuring the nose receiving section.
Figure 9C:
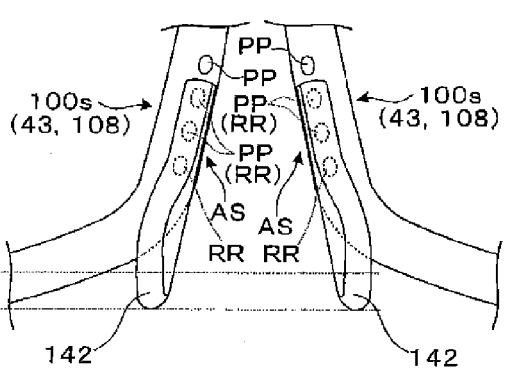

FIG. 9A is a diagram schematically showing an example of an adjusting section including a nose receiving section 140 in the virtual image display apparatus according to this embodiment. FIGS. 9B and 9C are diagrams schematically showing attachment and detachment of a pair of left and right pad sections 142 in the nose receiving section 140 shown in FIG. 9A. As shown in the figures, the nose receiving section 140 includes, besides the pair of left and right pad sections 142, attachment structure sections AS provided to correspond to the pad sections 142. As shown in the figure, the attachment structure section AS is configured by a plurality of (in the example shown in the figures, three) convex sections PP having the same shape provided side by side in a row at a fixed interval in the apparatus main body 100s (e.g., a portion equivalent to the protector 108, the nose receiving section 40, and the fixed section 43 shown in FIG. 3). On the other hand, the pad section 142 includes a plurality of (in the example shown in the figures, three) concave sections RR having the same shape provided side by side in a row to correspond to the convex sections PP of the attachment structure section AS. As shown in FIGS. 9B and 9C, the nose receiving section 140 is positioned and fixed by fitting the concave sections RR of the pad sections 142 with the convex sections PP of the attachment structure sections AS. In positioning and fixing the nose receiving section 140, for example, between FIG. 9B and FIG. 9C, the height of the nose receiving section 140 can be changed as indicated by broken lines P1 and P2 by changing positions where the plurality of concave sections RR and the plurality of convex sections PP are combined.

Third Embodiment

A virtual image display apparatus according to a third embodiment is explained below with reference to FIGS. 10A to 10C. The virtual image display apparatus in this embodiment is a modification of the virtual image display apparatus 100 in the first embodiment and the like. The virtual image display apparatus in this embodiment is the same as the virtual image display apparatus 100 in the first embodiment except the structure of temple sections. Therefore, only the temple sections and sections around the temple sections are shown in the figures and explained. The entire configurations and the like of the virtual image display apparatus are not shown in the figures and not explained. A pair of temple sections has a symmetrical structure. Therefore, only one of the temple sections is shown in the figures and explained. The other is not shown in the figures and not explained.

Figure 10A:
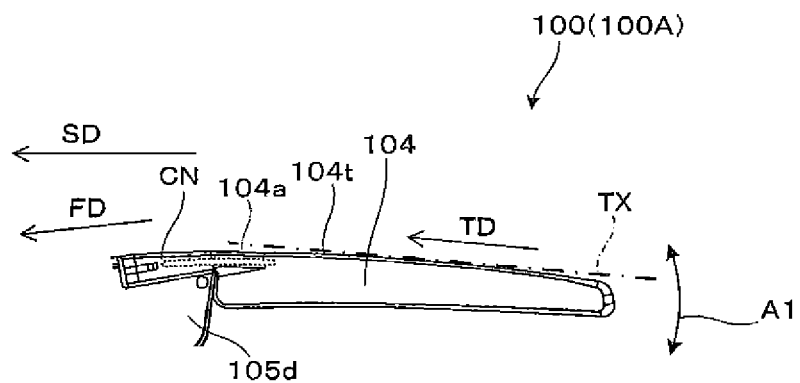
FIG. 10A is a diagram showing an example of a temple section in a virtual image display apparatus according to a third embodiment.

FIG. 10A is a diagram showing an example of a temple section 104 in the virtual image display apparatus 100 in this embodiment. As explained above, a pair of temple sections 104 is supported by the ears during wearing to support the virtual image display apparatus 100. As shown in the figure, the coupling section CN of the temple section 104 and the side surface section 107b of the frame 107 has a hinge structure. Therefore, the temple section 104 can be folded. Further, in this embodiment, as schematically shown in FIG. 10A, a deformable cored bar section 104a is built in the inside from the coupling section CN to the temple section 104. That is, by deforming the cored bar section 104a, it is possible to change the posture of the temple section 104, for example, in a direction indicated by an arrow A1 and perform position adjustment concerning the position of a video. More specifically, when a direction in which the temple section 104 extends is represented as reference axis TX indicating a direction in which an upper end portion 104t of the temple section 104 extends and a direction in which the reference axis TX extends is represented as temple axis direction TD, by adjusting, with respect to the reference direction FD, an angle of the temple axis direction TD in which the temple section 104 extends, as a result, it is possible to change a direction (an angle) of the reference direction FD with respect to the front direction SD. That is, it is possible to change the posture of the virtual image display apparatus 100 with respect to the eye EY of the observer. That is, a portion including the temple section 104 functions as an adjusting section.

Figure 10B:
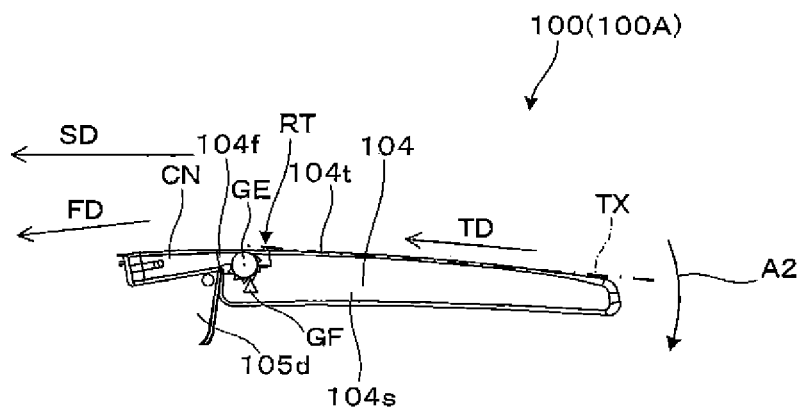
FIG. 10B is a diagram showing a modification of the temple section.

FIG. 10B is a diagram showing a modification of the temple section 104. In this embodiment, since the temple section 104 includes a ratchet mechanism RT, a portion including the temple section 104 functions as an adjusting section. Specifically, the temple section 104 includes an attachment portion 104f fixedly attached to the coupling section CN, a main body portion 104s attached in a state in which the main body portion 104s is movable in a direction indicated by an arrow A2 with respect to the attachment portion 104f, and the ratchet mechanism RT. The ratchet mechanism RT includes a gear section GE incidental to the attachment portion 104f in the temple section 104 and a wedge-like protrusion section GF incidental to the main body portion 104s of the temple section 104. The gear section GE is disc-like and includes, in the outer circumference thereof, a plurality of ratchet teeth having shape deviated to one side. The attachment portion 104f is rotatable as a center axis of the disc-like gear section GE. The protrusion section GF of the temple section 104 meshes with the ratchet teeth of the gear section GE on the distal end side and, while being subjected to rotation limitation for preventing reverse rotation, makes it possible to change the posture of the temple section 104 in multiple stages in the direction indicated by the arrow A2. In this case, since the rotation limitation for preventing reverse rotation is applied, the adjustment of the posture is performed only in one direction as indicated by, for example, the arrow A2. However, if the temple section 104 includes, for example, a mechanism capable of releasing the meshing of the protrusion section GF and the ratchet teeth and releasing the rotation limitation by the ratchet mechanism RT, it is possible to return the posture of the temple section 104 to the initial state.

Besides the above, it is also possible to adopt, for example, a form for making all or a part of the temple section 104 detachably attachable and selecting the temple section 104 out of temple sections having different sizes and shapes. Further, it is also possible to make a temple pad attached to a portion (an inner side portion) in contact with the side head section detachably attachable and change the posture of the temple section 104 with respect to the eyes of the observer according to the shape of the temple pad.

Fourth Embodiment

A virtual image display apparatus according to a fourth embodiment is explained below with reference to FIG. 11A and the like. The virtual image display apparatus in this embodiment is a modification of the virtual image display apparatus 100 in the first embodiment. The virtual image display apparatus in this embodiment is the same as the virtual image display apparatus 100 in the first embodiment except processing of image correction. Therefore, the entire configuration and the like of the virtual image display apparatus are not shown in the figure and not explained.

Figure 11A:
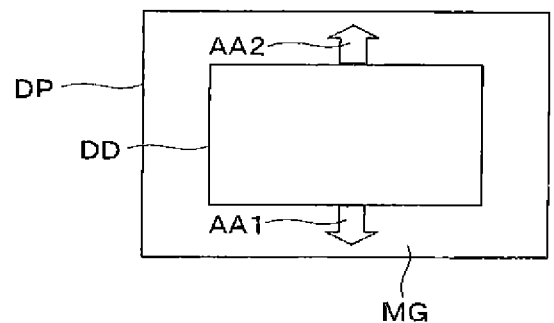
FIG. 11A is a diagram for explaining image correction in a virtual image display apparatus according to a fourth embodiment.

FIG. 11A is a diagram for explaining the image correction in the virtual image display apparatus according to this embodiment and shows a range of a video to be displayed. That is, FIG. 11A imaginary shows a range in which a virtual image, which should be recognized as an image, is projected on the eyes of an observer. In the figure, a displayable region DP indicates a range in which a video can be displayed by the image display device 80 (see FIG. 4). On the other hand, a video region DD indicates a range in which a video is actually displayed in the range indicated by the displayable region DP. In this case, not all the displayable region DP is used as video region DD. A margin MG is provided to enable the processing of the image correction for shifting the video region DD as appropriate, for example, in directions of arrows AA1 and AA2 (the up down direction) in the surface of the displayable region DP in a range of the margin MG. That is, by adjusting a position projected as the video region DD, as a result, it is possible to change the visual line of the observer. Processing of position adjustment for the video region DD is enabled by, for example, giving an image processing function to the liquid crystal driving circuit 84b (see FIG. 4) of the image display device 80. That is, in this embodiment, the liquid crystal driving circuit 84b functions as an image correcting section configured to adjust a range of image formation by the video display device 82. Consequently, the liquid crystal driving circuit 84 functions as an adjusting section.

The adjustment performed using the image correcting unit as the adjusting section is equivalent to changing a center position of an image. Therefore, in Expression (2) explained in the first embodiment, the angle η is changed to an ideal state by adjusting a value of the angle θ.

Figure 11B:
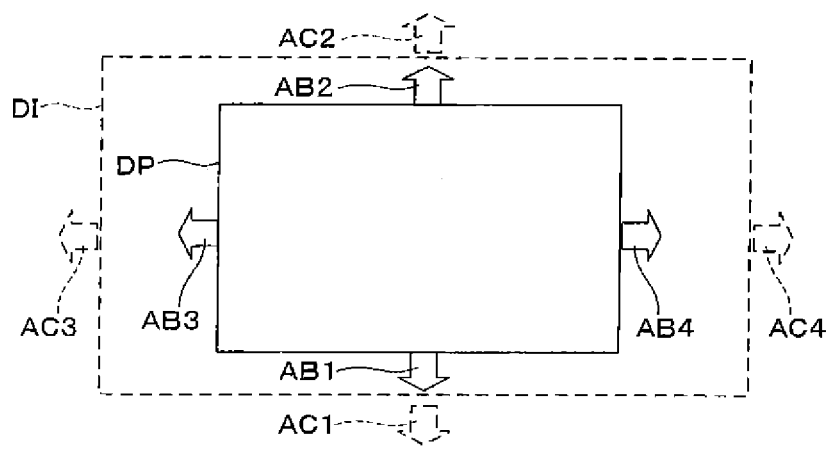
FIG. 11B is a diagram for explaining a modification of image correction.

In the above explanation, the range of the displayable region DP may be further expanded. For example, as shown in FIG. 11B, if an imaginary video region DI having image information in a wider range is set and the displayable region DP can be designated in the video region DI, it is possible to change the displayable region DP in the range of the video region DI. In this case, for example, by mounting a gyro sensor on the virtual image display apparatus, it is possible to synchronize a change in the range of the displayable region DP with a motion of the body of the observer and change, in directions indicated by arrows AB1 to AB4, a range of an image that should be projected in the displayable region DP.

Concerning the range of the video region DI, an imaginary range can be further expanded as indicated by arrows AC1 to AC4. For example, the range of the video region DI may be rotated 360° to connect a distal end of a direction indicated by the arrow AC1 and a distal end of a direction indicated by the arrow AC2 and connect a distal end of a direction indicated by the arrow AC3 and a distal end of a direction indicated by the arrow AC4 to set the range connected as a whole as the imagery video region DI.

The invention is explained above according to the embodiments. However, the invention is not limited to the embodiments and can be carried out in various forms without departing from the spirit of the invention. For example, modifications explained below are also possible.

First, in the above explanation, the support position reference plane SS, which is the reference for configuring the virtual image display apparatus 100, is defined by the center position YP of the eyeball and the upper end position AP of the root of the ear present in the standard positions. However, the support position reference plane SS is not limited to this. Various positions can be set as a plane serving as the reference. For example, when the frame is supported by the entire ear other than the upper end of the root of the ear, a plane including the standard center position of the eyeball and the center position in the entire ear, which supports the frame, may be set as the support position reference plane.

In the above explanation, the frame 107 directly supports the image display device 80 and the light guide device 20, which are the optical systems configured to form video light, in the virtual image display apparatus 100. However, the frame 107 does not always have to directly support all of the optical systems. For example, it is also possible that the image display device BO and the light guide device 20 are housed in an integral case or the like and the frame 107 indirectly supports the image display device 80 and the light guide device 20 via the case or the like.

In the above explanation, the nose receiving section functions as the adjusting section in the first embodiment, the temple section functions as the adjusting section in the second embodiment, and the image correcting section functions as the adjusting section in the third embodiment. However, the nose receiving section, the temple section, and the image correcting section may be combined to perform adjustment. All of the combined nose receiving section, temple section, and image correcting section may be the adjusting section. In this case, it is also possible to perform, for example, during wearing, adjustment using the nose receiving section and the temple section and, for example, when it is seen that the adjustment is not sufficiently performed during the wearing, perform readjustment using the image correcting unit during image observation. If the virtual image display apparatus 100 has a plurality of adjustment functions to further expand the adjustable range, even when the observer having the positions of the eyes, the nose, and the ears greatly deviating from the standard positions uses the virtual image display apparatus 100, it is possible to realize a state suitable for long-time observation. For example, when adjustment by a method in terms of an external mechanism such as the nose receiving section, the temple section, or the like is performed first, a correction amount in processing in terms of image processing (an internal mechanism) by the image correcting unit may be small. That is, the video region DD shown in FIG. 11A can be increased (the margin MG can be reduced). Concerning the individual differences, in general, the influence due to the shape and the position of the nose is the largest. Therefore, for example, when the adjusting sections are combined, the adjustment by the nose receiving section may be given priority over the adjustment by the other adjusting sections.

As an adjusting section other than the above, for example, a headband having elasticity and wound around the head from the side head section to the back of head of the observer may be used. The virtual image display apparatus may be fixed by the headband while maintaining a state in which the virtual image display apparatus is adjusted to a desired position and a desired angle with respect to the eyes of the observer.

In the embodiments, in the image display device 80, the video display device 82 including the transmissive liquid crystal display device or the like is used. However, the image display device 80 is not limited to the video display device 82 including the transmissive liquid crystal display device or the like. Various liquid crystal devices can be used. For example, a reflective liquid crystal display device can be used. A digital micro mirror device or the like can be used instead of the video display device 82 including the liquid crystal display device. As the image display device 80, a self-emitting device represented by an LED array, an OLED (organic EL), and the like can be used.

As a fixing method for the video display device 82 and the projection lens 30, various methods for directly fixing the video display device 82 to the lens barrel 39 can be used.

The frame section 102 is not limited to the shape illustrated in the embodiments or the external appearance similar to the frame of the eyeglasses and can be formed in various shapes that can bridge the projection lens 30 and the light guide device 20. Concerning the shape of the nose receiving sections 40 and 140, various shapes can be applied.

In this embodiment, the frame 107 and the projection lens 30 are separate. The projection lens 30 is fixed to the frame 107 by screwing. However, the lens barrel 39 of the projection lens 30 can be molded integrally with the frame 107. As a method of integrally molding the lens barrel 39 and the frame 107, there are methods such as outsert molding and lens barrel section shaving after die cast integral molding.

The light guide device 20 or the projection lens 30 is not limited to the fastening by the screwing and can be fixed to the frame 107 by various methods.

In the embodiment, the engaging member 39a with the light guide device 20 is provided in the lens barrel 39 of the projection lens 30. However, an engaging member fitting with the lens barrel 39 can be provided to, for example, hold the lens barrel 39 on the light guide device 20 side.

In the embodiment, the half mirror layer (the semi-transmitting reflection film) 15 is formed in the laterally long rectangular region. However, the contour of the half mirror layer 15 can be changed as appropriate according to an application and the like. The transmittance and reflectance of the half mirror layer 15 can also be changed according to an application and the like.

In the embodiment, the half mirror layer 15 is the mere semi-transmissive film (e.g., the metal reflection film or the dielectric multilayer film). However, the half mirror layer 15 can be replaced with a hologram device having a flat surface or a curved surface.

In the embodiment, the distribution of the display luminance in the video display device 82 is not particularly adjusted. However, for example, when a luminance difference occurs depending on a position, the distribution of the display luminance can be unequally adjusted.

In the above explanation, the virtual image display apparatus 100 including the pair of display apparatus 100A and 100B is explained. However, the virtual image display apparatus 100 can include a single display apparatuses. That is, rather than providing one set of the projection see-through device 70 and the image display device 80 for each of the right and left eyes, the projection see-through device 70 and the image display device 80 may be provided for one of the right and left eyes to view an image with one eye. In this case, the frame 107 and the temple sections 104 can be arranged symmetrically as shown in FIG. 1 and the like.

In the embodiment, on the first surface S11 and the third surface S13 of the light guide member 10, video light is totally reflected by an interface with the air without applying a mirror, a half mirror, or the like on the surfaces. However, the total reflection in the virtual image display apparatus 100 according to the invention includes reflection performed by forming a mirror coat or a half mirror film on the entire first surface S11 or third surface S13 or a part of the first surface S11 or the third surface S13. For example, the total reflection also includes reflection of substantially all video light performed by applying a mirror coat or the like to the entire first surface S11 or third surface S13 or a part of the first surface S11 or the third surface S13 on condition that an incident angle of the video light satisfies all reflection conditions. If video light having sufficient brightness is obtained, the entire first surface S11 or third surface S13 or a part of the first surface S11 or the third surface S13 may be coated with a mirror having slight transmissivity.

In the above explanation, the light guide member 10 and the like extend in the lateral direction in which the eyes EY range. However, the light guide member 10 can be arranged to extend in the longitudinal direction. In this case, the light guide member 10 is supported by, for example, a cantilever state in an upper part.

The first surface S11 and the third surface S13 arranged to be opposed to each other are formed in the concave surface shape with respect to the observer. However, the first surface S11 and the third surface S13 may be formed in a parallel plane shape. In this case, visibility can be set to 0 when the observer views the outside world through the first surface S11 and the third surface S13. When the first surface S11 and the third surface S13 have the parallel plane shape, for example, the surfaces other than the first surface S11 and the third surface S13 may be formed as curved surfaces to form an intermediate image. Alternatively, the intermediate image does not have to be formed.

The entire disclosure of Japanese Patent Application No. 2013-102800, filed May 15, 2013 is expressly incorporated by reference herein.

What is claimed is:

1. A virtual image display apparatus comprising:
a video device;
a light guide member arranged in front of an eye of an observer and configured to direct light emitted from the video device to the eye of the observer and cause the observer to visually recognize an image;
a frame configured to arrange the light guide member in a predetermined position in front of the eye and support the light guide member on the basis of a support position reference plane decided assuming at least a standard position of the eye; and
an adjusting section configured to adjust an emission state of the light from the light guide member with respect to the eye of the observer, the adjusting section including a nose receiving section configured to come into contact with a nose of the observer and to support the virtual image display apparatus during wearing, the adjusting section changing a posture of the nose receiving section,
wherein the adjusting section further includes a plurality of pad sections that are brought into contact with the nose, the pad sections being attached to a part of the nose receiving section,
wherein the adjusting section further includes a plurality of convex sections disposed in a row on an apparatus main body section of the adjusting section,
wherein the plurality of pad sections include a pair of separate left and right pad sections each comprising a plurality of concave sections spaced side by side in a row so as to correspond to and be interactable with the plurality of convex sections on the apparatus main body section of the adjusting section,
wherein the nose receiving section is positioned and fixed by fitting the concave sections of the pad sections with the convex sections on the apparatus main body, and a height of the nose receiving section is adjusted by changing positions in which the concave sections of the left and right pad sections are combined with the convex sections,
wherein the light guide member emits light, which the light guide member should cause the observer to visually recognize, from a direction angled with respect to the support position reference plane and causes the observer to visually recognize the image from an overlooking direction for causing the eye of the observer to overlook a downward side, and
wherein the adjusting section changes an angle in the overlooking direction with respect to the position of the eye of the observer by adjusting an emission state of the light from the light guide member.

2. The virtual image display apparatus according to claim 1, wherein the support position reference plane is a plane including a center position of an eyeball assumed as a standard position and an upper end position of a root of an ear assumed as a standard position.

3. The virtual image display apparatus according to claim 1, wherein the adjusting section includes a temple section configured to come into contact with an ear of the observer during wearing and changes a posture of the temple section.

4. The virtual image display apparatus according to claim 3, wherein the adjusting section further includes a ratchet mechanism configured to change the temple section to extend in a direction angled with respect to the support position reference plane.

5. The virtual image display apparatus according to claim 1, wherein the adjusting section includes a deformable cored bar section built in a part of a supporting section that supports the apparatus.

6. The virtual image display apparatus according to claim 1, wherein the adjusting section includes an image correcting section configured to adjust a range of image formation by the video device.

7. The virtual image display apparatus according to claim 1, wherein the adjusting section adjusts an angle in the overlooking direction with respect to a front direction of the eye of the observer to be within a range of an angle larger than 0° and equal to or smaller than 15°.

8. The virtual image display apparatus according to claim 1, wherein the light guide member further includes a light transmitting member configured to guide the light emitted from the video device and enable see-through of external light and coupled to the light guide ember to supplement a see-through function for the external light.

9. The virtual image display apparatus according to claim 1, wherein the adjusting section adjusts an angle in the overlooking direction with respect to a front direction of the eye of the observer in observation of the external light.

10. The virtual image display apparatus according to claim 1, wherein the pad section is detachably attached to the apparatus main body section.

\* \* \* \* \*